United States Patent [19]

Wedding

[11] Patent Number: 5,436,752
[45] Date of Patent: Jul. 25, 1995

[54] RECEIVE-SIDE CIRCUIT FOR A SYSTEM FOR OPTICALLY TRANSMITTING A DIGITAL SIGNAL OVER A DISPERSIVE OPTICAL WAVEGUIDE

[75] Inventor: Berthold Wedding, Korntal-Munchingen, Germany

[73] Assignee: Alcatel N.V., Amsterdam, Netherlands

[21] Appl. No.: 144,744

[22] Filed: Oct. 28, 1993

[30] Foreign Application Priority Data

Oct. 29, 1992 [DE] Germany .................. 42 36 488.4

[51] Int. Cl.⁶ .................. H04B 10/06; H04B 10/12
[52] U.S. Cl. .................. 359/195; 359/173; 375/292
[58] Field of Search .......... 359/179, 188, 182, 195, 359/173; 375/17, 19; 307/351, 360

[56] References Cited
U.S. PATENT DOCUMENTS

| | | | |
|---|---|---|---|
| 4,504,975 | 3/1985 | Jarret | 359/195 |
| 4,581,731 | 4/1986 | Tomikashi | 359/195 |
| 4,665,531 | 5/1987 | Aly | 375/17 |
| 5,357,378 | 10/1994 | Urakawa | 375/17 |

*Primary Examiner*—Leslie Pascal
*Attorney, Agent, or Firm*—Baker & Botts

[57] ABSTRACT

If a digital signal is transmitted over a dispersive optical waveguide (3) with an optical transmitter (2) whose output signal is frequency-modulated (here: FSK-modulated) by the digital signal, the two wave trains which occur in FSK modulation arrive at the end of the fiber-optic link at different times (propagation time difference $\Delta\tau$). The electric output signal V of an optical-to-electrical transducer (5) at the receive side is intensity-modulated and passes through three ranges of values. To recover the digital signal therefrom, use is made of a novel circuit (6) whose output assumes a first state when a sample value is in the first range of values, a second state when a sample value is in the second range, and the same state as N bits earlier when a sample value is in the third range.

8 Claims, 3 Drawing Sheets

| CLOCK PULSES \ SIGNALS | $V_0$ | $V_1$ | $S_1$ | $\bar{S}_1$ | $S_0$ | $\bar{S}_0$ | $S_2$ | d | e | f | g | h | i | k |
|---|---|---|---|---|---|---|---|---|---|---|---|---|---|---|
| 1 | < | < | 0 | 1 | 0 | 1 | 0 | 0 | 0 | 0 | 1 | | | |
| 2 | > | < | 0 | 1 | 1 | 0 | 1 | | | | | 0 | | |
| 3 | > | < | 0 | 1 | 1 | 0 | 1 | | | | | | 0 | |
| 4 | > | < | 0 | 1 | 1 | 0 | 1 | 0 | 1 | 0 | 1 | | | 0 |
| 5 | > | < | 1 | 0 | 1 | 0 | 0 | 0 | 0 | 1 | 0 | 0 | | |
| 6 | > | < | 0 | 1 | 0 | 1 | 0 | 0 | 0 | 0 | 1 | 1 | 0 | |
| 7 | > | < | 1 | 0 | 1 | 0 | 0 | 0 | 0 | 1 | 0 | 0 | 1 | 0 |
| 8 | > | < | 0 | 1 | 1 | 0 | 1 | 1 | 0 | 1 | 0 | 1 | 0 | 1 |
| 9 | > | > | 1 | 0 | 1 | 0 | 0 | 0 | 0 | 1 | 0 | 1 | 1 | 0 |
| 10 | > | < | 0 | 1 | 0 | 1 | 0 | 0 | 0 | 0 | 1 | 1 | 1 | 1 |
| 11 | > | < | 0 | 1 | 0 | 1 | 0 | 0 | 0 | 0 | 1 | 0 | 1 | 1 |
| 12 | > | < | 0 | 1 | 0 | 1 | 0 | 0 | 0 | 0 | 1 | 0 | 0 | 1 |
| 13 | > | > | 1 | 0 | 1 | 0 | 0 | 0 | 0 | 1 | 0 | 0 | 0 | 0 |
| 14 | > | < | 0 | 1 | 1 | 0 | 1 | 0 | 1 | 0 | 1 | 1 | 0 | 0 |
| 15 | > | > | 1 | 0 | 1 | 0 | 0 | 0 | 0 | 1 | 0 | 0 | 1 | 0 |
| 16 | > | < | 0 | 1 | 1 | 0 | 1 | 1 | 0 | 1 | 0 | 1 | 0 | 1 |
| 17 | > | < | 0 | 1 | 1 | 0 | 1 | 0 | 1 | 0 | 1 | 1 | 1 | 0 |
| 18 | < | < | 0 | 1 | 0 | 1 | 0 | 0 | 0 | 0 | 1 | 0 | 1 | 1 |
| 19 | < | < | 0 | 1 | 0 | 1 | 0 | 0 | 0 | 0 | 1 | 0 | 0 | 1 |
| 20 | > | < | 0 | 1 | 1 | 0 | 1 | 0 | 1 | 0 | 1 | 0 | 0 | 0 |
| 21 | > | < | 0 | 1 | 1 | 0 | 1 | 0 | 1 | 0 | 1 | 0 | 0 | 0 |

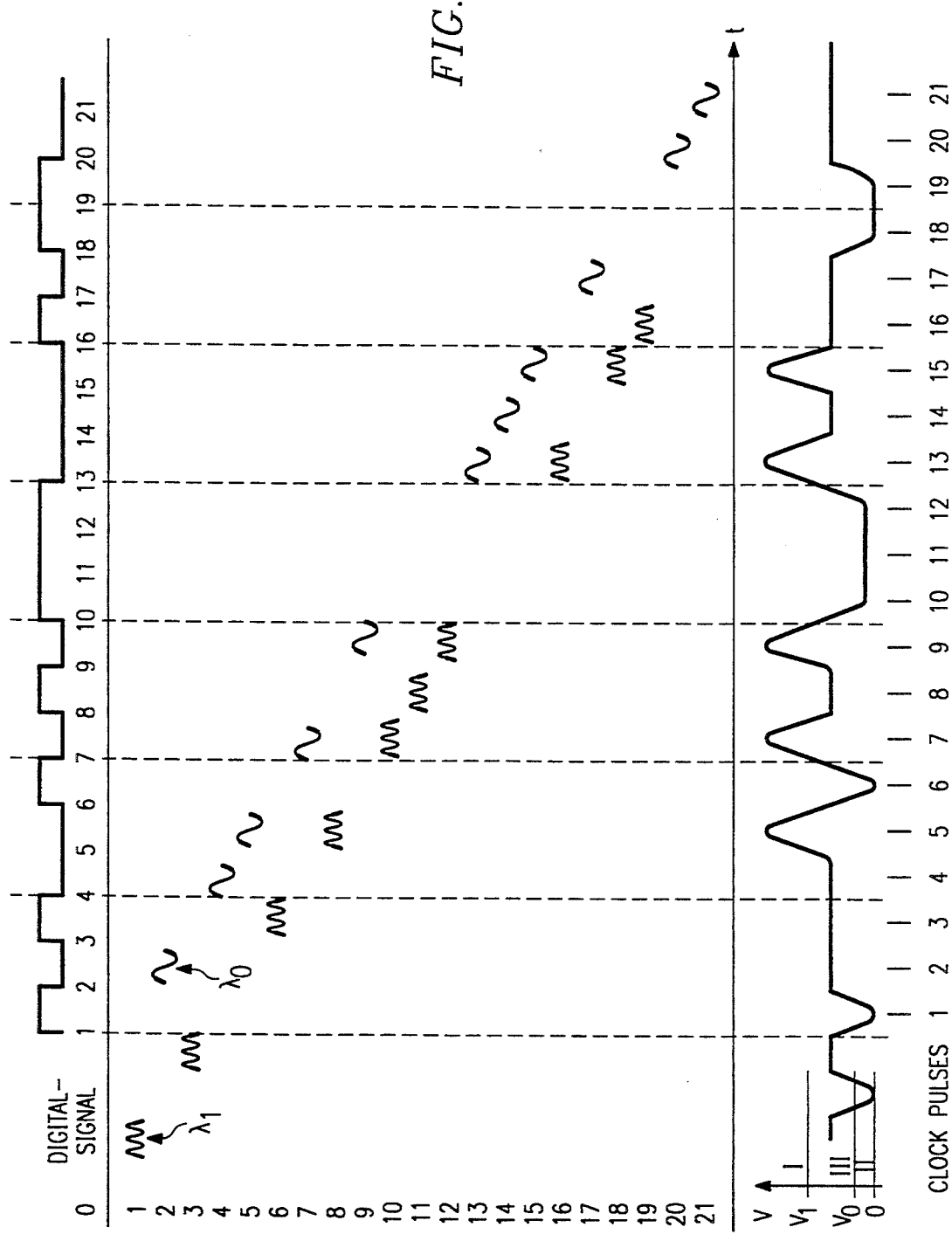

RECEIVE-SIDE CIRCUIT FOR A SYSTEM FOR OPTICALLY TRANSMITTING A DIGITAL SIGNAL OVER A DISPERSIVE OPTICAL WAVEGUIDE

CROSS REFERENCE TO RELATED APPLICATIONS

This application is related to co-pending U.S. application Ser. No. 08/011,297 filed Jan. 29, 1993, and entitled "A System For Optically Transmitting Digital Communications Over an Optical Fiber with Dispersion at the Operating Wavelength." This application is owned by Alcatel N.V., assignee of the present application.

TECHNICAL FIELD OF THE INVENTION

The present invention generally relates to a receive-side circuit for a system for optically transmitting a digital signal over an optical waveguide and to a system for optically transmitting a digital signal over an optical waveguide which is dispersive at the operating wavelength.

BACKGROUND OF THE INVENTION

A system and a receive-side circuit with the features mentioned there are known from B. Wedding, "New Method for Optical Transmission Beyond Dispersion Limit", *Electronics Letters*, 2nd Jul. 1992, Vol. 28, No. 14, pages 1298 and 1300. In that article, a system for optically transmitting a digital signal over a dispersive optical waveguide is described. The digital signal frequency-modulates an optical transmitter. As a result, wave trains with different wavelengths $\lambda_0$ and $\lambda_1$ are launched into the optical waveguide. Due to chromatic dispersion of the optical waveguide, the time required for light with the longer wavelength $\lambda_0$ to propagate through the fiber-optic link is greater than that required for light with the shorter wavelength $\lambda_1$. Accordingly, there is a period of time $\Delta\tau$ during which the last part of the first wave train of wavelength $\lambda_0$, for example, overlaps the first part of the wave train of wavelength $\lambda_1$. This period $\Delta\tau$ is called "propagation time difference" and is given by $$\Delta\tau = \Delta\lambda \cdot D \cdot L$$

where
$\Delta\lambda$ = difference between $\lambda_0$ and $\lambda_1$
$D$ = chromatic dispersion of the optical waveguide
$L$ = length of the fiber-optic link 3.

As a result of the above-mentioned overlaps, an intensity-modulated signal is received at the end of the fiber-optic link. To recover the digital signal from this signal, an integrator or low-pass filter in conjunction with a decision circuit is provided. The decision circuit is not explained, however.

It is, therefore, the object of the invention to provide a receive-side circuit whereby the digital signal can be recovered.

This object is attained by providing a receive-side circuit for a system that optically transmits a digital signal over an optical waveguide which is dispersive at the operating wavelength. The system includes an optical transmitter whose optical output signal, which is frequency-modulated by the digital signal, is optically transmitted over the optical waveguide. The input through the receive-side circuit is an electric output signal (V) for an optical-to-electrical transducer that passes through three ranges of values. A first of the ranges lies above an open threshold ($V_1$). A second lies below a lower threshold value ($V_0$). The third is between the upper and lower threshold values. The receive-side circuit recovers the digital signal from the sample values of the electric output signal (V) and is characterized by its output assuming a first state when a sample value lies in the first range of values, that its output assumes a second state when a sample value lies in the second range of values, and its output assumes the state which is present at the same output N-bit earlier than a sample value lies in the third range of values, where N is the rounded-up integral value of $$\frac{\Delta\lambda \cdot D \cdot L}{T}.$$

D is the dispersion of the optical waveguide, L is the length of the optical waveguide, T is the duration of one bit, and $\Delta\lambda$ is the wavelength difference underlying the frequency modulation.

One aspect of the invention is that based on the receive-side circuit, a novel optical transmission system is provided. The present invention, therefore, provides a system for optically transmitting a digital signal over an optical waveguide that is dispersive at the optical wavelength. The system includes an optical transmitter on the transmit side whose optical output signal is frequency-modulated by the digital signal. An optical-to-electrical transducer on the receive-side that converts its optical input signal, which passes through three ranges of values, into an optical output signal (V), that corresponds to the intensity variation of the optical input signal and passes through three ranges of values. A first of the ranges of values lies above the upper threshold value ($V_1$), a second lies below a lower threshold value ($V_0$), and a third lies between the upper and lower threshold values. The system further includes a circuit that follows the optical-to-electrical transducer which recovers the digital signal from the sample values of the electrical output signal (V) of the optical-to-electrical transducer. The circuit is characterized in that its output assumes a first state when a sample value lies in the first range of values, a second state when a sample value lies in the second range of values, and a state which is present at the same output N-bits earlier when a sample value lies in the third range of values, where N is the rounded-up integral value of $$\frac{\Delta\lambda \cdot D \cdot L}{T}$$

where D is the dispersion of the optical waveguide, L is the length of the optical waveguide, T is the duration of one bit, and $\Delta\lambda$ is the wavelength difference underlying the frequency modulation. Further advantageous features of the invention are defined in the subclaims.

One advantage of the invention is that the receive-side circuit will recover the digital signal even if the propagation time difference $\Delta\tau$ is a multiple of the duration of one bit.

BRIEF DESCRIPTION OF THE DRAWINGS

The invention and its modes of use and advantages are best understood by reference to the following description of illustrative embodiments when read in configuration with the accompanying drawings, wherein:

FIG. 5 shows one example of a received electric output signal, assuming a digital signal to be transmitted and a propagation time difference $\Delta \tau$ equal to the duration of three bits.

DESCRIPTION OF THE PREFERRED EMBODIMENT

The preferred embodiment of the present invention is best understood by referring to the Figures wherein like numerals are used for like and corresponding parts of the various drawings.

Figure 1:
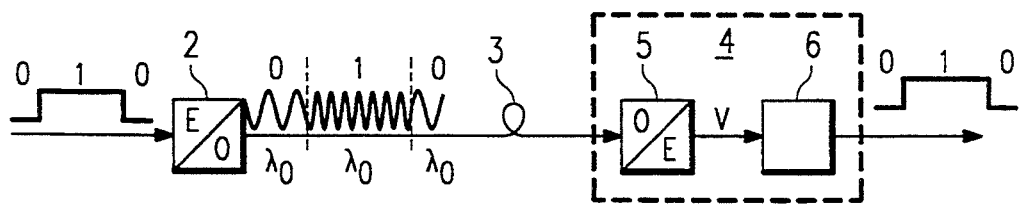
FIG. 1 is a block diagram of the system in which the invention is used.

The transmission system for digital signals shown in FIG. 1 includes on the transmit side (left-hand portion of the figure) an electrical-to-optical transducer 2, whose essential element is a semiconductor laser which has the property of converting an electric input signal in the form of a binary digital signal by frequency modulation, here frequency-shift keying (FSK), to a correspondingly modulated optical output signal. The optical output signal thus has different frequencies for the different binary states of the digital signal to be transmitted. In FIG. 1, the binary state "0" represents a wavelength $\lambda_0$, and the binary state "1" a wavelength $\lambda_1$. With this modulation, the intensity normally remains constant, as is indicated in the figure by wave trains with different frequencies, but equal amplitudes.

This transmit-side facility is connected to an optical receiver 4 of the system by an optical waveguide 3, which forms the transmission link.

The receive-side facility includes an optical-to-electrical transducer 5 which contains an optical detector, a preamplifier and an amplifier and converts the time variation of the intensity of its optical input signal to a time variation of the amplitude of its electric output signal V. The optical receiver 4 further includes a receive-side circuit 6 which recovers the transmitted digital signal from the electric output signal V of the optical-to-electrical transducer 5. This digital signal is indicated schematically at the output.

The electric output signal V of the optical-to-electrical transducer passes through three ranges of values: a first range above an upper threshold value $V_1$, a second range below a lower threshold value $V_0$, and a third range between the upper and lower threshold values.

When the electric output signal lies in the first range of values, this means that two wave trains of the optical signal have been constructively superimposed, so that a higher light power is being received.

If the input signal lies in the second range of values, this means that practically no light power is being received because, due to the propagation time differences, one of the wave trains has ended before the other begins.

If the output signal lies in the third range of values, this means that the "normal" light power is being received, which is not influenced by propagation time differences of different wave trains.

The waveform of this electric output signal V corresponds to that of the optical signal after passage through the fiber-optic link.

Figure 2:
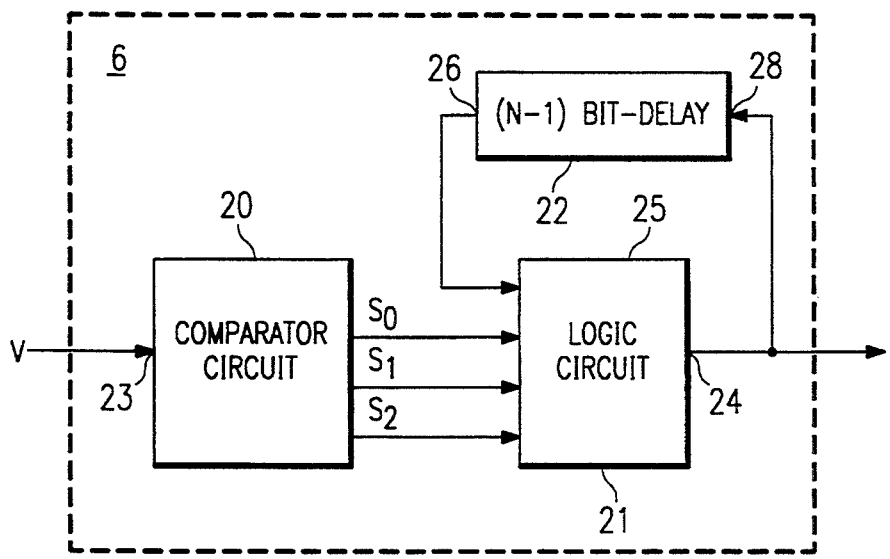
FIG. 2 is a block diagram of a first embodiment of the receive-side circuit in accordance with the invention.

With the receive-side circuit shown in FIG. 2 in a block diagram, the three ranges of values are evaluated. The circuit consists of a comparator circuit 20, a logic circuit 21, and an (N−1)-bit delay circuit 22, e.g., an (N−1)-bit shift register. The comparator circuit is connected to the optical-to-electrical transducer 5 (FIG. 1) via an input 23 and has three signal outputs $S_0$, $S_1$, $S_2$ for signals designated by the same reference characters. The logic circuit 21 has an input 25, three inputs for the signals $S_0$, $S_1$, and $S_2$, and an output 24, which is coupled to the (N−1)-bit delay circuit 22. The (N−1)-bit delay circuit has an input 28 and an output 26. In this embodiment, the (N−1)-bit delay circuit 22 is contained in a feedback loop from the output 24 to the input 25 of the logic circuit.

Comparator circuit, logic circuit, and (N−1)-bit delay circuit are synchronized by a clock signal. This means that the electric output signal V of the optical-to-electrical transducer 5 of FIG. 1 is evaluated at successive instants determined by the clock signal. Each signal value sampled at such an instant will henceforth be called a sample value of the electric output signal V, or "sample value" for short.

The comparator circuit evaluates the electric output signal V from the optical-to-electrical transducer 5 by delivering a first binary signal $S_1$ when the sample value is in the first range of values, a second binary signal $S_0$ when the sample value is in the second range, and a third binary signal $S_2$ when the sample value is in the third range.

The binary signals $S_0$, $S_1$, and $S_2$ may each assume two states: "set" represents Logic 1, and "not set" the inverse value.

Operation of the circuit 6 requires that the logic circuit 21 and the delay circuit 22 together introduce a delay equal to the duration of N bits. The division of the delay between the two circuits 21 and 22 is of no significance.

Preferably, the logic circuit 21, because of a clocked RS flip-flop at its output, provides a delay equal to the duration of one bit. In this case, the delay circuit 22 is an (N−1)-bit delay circuit. A detailed embodiment of such a logic circuit 21 will be explained with reference to FIG. 4.

The number N is the rounded-up integral value of $$\frac{\Delta\lambda \cdot D \cdot L}{T},$$

where T is the duration of one bit; D, L, and $\Delta\lambda$ were introduced above. This means that N is equal to the rounded-up integral value of the propagation time difference $\Delta\tau$.

Logic circuit 21 and (N−1)-bit delay circuit 22 have the following function. If the binary signal $S_1$ is set, the output 24 of the logic circuit assumes a first logic value, here logic 1. If the binary signal $S_0$ is set, the output 24 assumes a second logic value; the latter is the inverted value of the first logic value 1. If the binary signal $S_2$ is set, the output 24 assumes the value which the output 26 of the (N−1)-bit delay circuit has at that instant.

Figure 3:
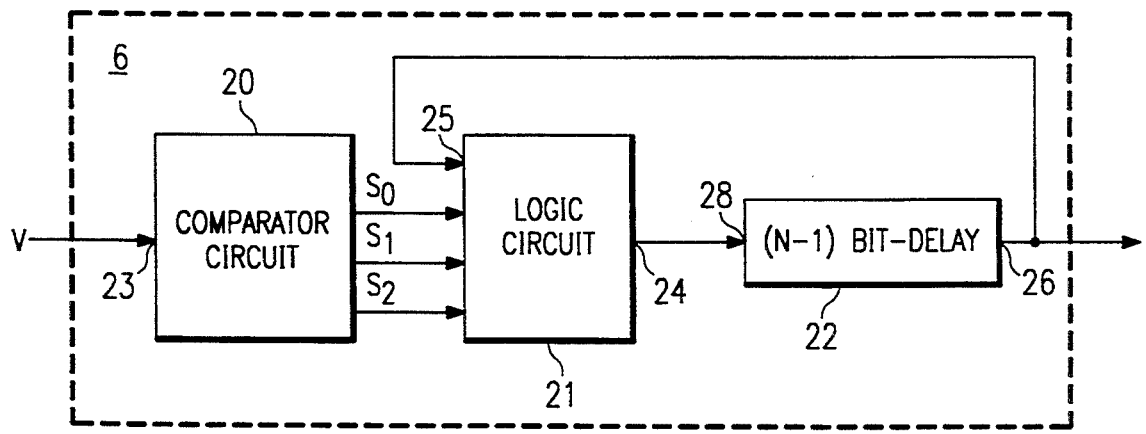
FIG. 3 is a block diagram of a second embodiment of the receive-side circuit in accordance with the invention.

In the (N−1)-bit delay circuit, the individual bits are shifted by one stage with each clock period. FIG. 3 shows a block diagram of a second embodiment of the receive-side circuit 6. Designations and reference characters are identical to those of FIG. 2.

Unlike in FIG. 2, the recovered digital signal is now available at the output 26 of the (N−1)-bit delay circuit 22. The digital signal is thus delayed by N bits, which, however, makes no difference for the further signal processing. Like in FIG. 1, the value at the output 26 is fed back to the input 25 and a delay by N bits is introduced between this input and output.

In principle, the digital signal is available after each stage of the (N−1)-bit delay circuit delayed by a corresponding time.

Figures 4, 6:
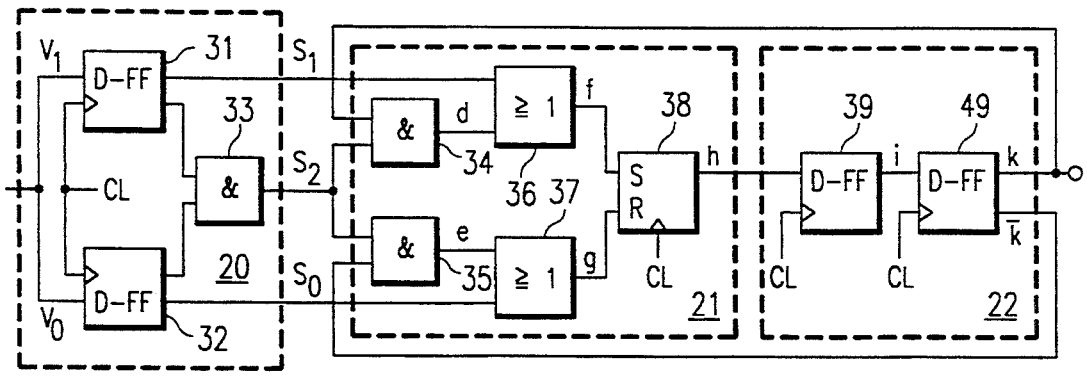
FIG. 4 shows a more detailed diagram of the circuit of FIG. 3.
FIG. 6 is a state table of the circuit of FIG. 4 for the example of FIG. 5.

FIG. 4 shows a more detailed diagram of the receive-side circuit 6 of FIG. 3 for a propagation time difference $\Delta\tau$ equal to the duration of three bits; hence, N=3. The first portion of the circuit, which corresponds to the comparator circuit 20, consists of two D flip-flops 31, 32 and an AND gate 33. The electric output signal V from the optical-to-electrical transducer 5 of FIG. 1 is applied in parallel to the two D flip-flops 31 and 32. Both D flip-flops are clocked by a clock signal Cl. The Q output of the D flip-flop 31 provides the signal $S_1$, and the $\overline{Q}$ output of the D flip-flop 32 the signal $S_0$. The $\overline{Q}$ output of the D flip-flop 31 and the Q output of the D flip-flop 32 are connected to the AND gate 33, whose output is the signal $S_2$.

The portion of the circuit which corresponds to the logic circuit 21 consists of two AND gates 34 and 35, two OR gates 36 and 37, and the above-mentioned RS flip-flop 38. A first input of the OR gate 36 is supplied with the binary signal $S_1$, and a second input of this OR gate is connected to an output of the AND gate 34. A first input of the OR gate 37 is supplied with the binary signal $S_0$, and a second input of this OR gate is connected to an output of the AND gate 35. The binary signal $S_2$ is applied to a first input of the AND gate 34 and to a first input of the AND gate 35. A second input of the AND gate 34 is connected to a Q output of a D flip-flop 49 (forming part of the (N−1)-bit delay circuit), and a second input of the AND gate 35 is connected to a $\overline{Q}$ output of the D flip-flop 49.

An output of the OR gate 36 is coupled to an input S of the RS flip-flop 38, and an output of the OR gate 37 is coupled to an input R of this flip-flop. An output of this flip-flop is connected to the (N−1)-bit delay circuit.

The portion of the circuit which corresponds to the (N−1)-bit delay circuit 22 consists of two D flip-flops 39 and 49. A Q output of the logic circuit 21 is connected to one input of the D flip-flop 39. A Q output of the D flip-flop 39 is coupled to one input of the D flip-flop 49. At the Q output of the D flip-flop 49, the digital signal is available. The flip-flops 39, 49 are clocked by the clock signal Cl. In this embodiment, the delay circuit 22 introduces a delay of two bits, i.e., N1=2.

The operation of the receive-side circuit will now be explained with reference to FIGS. 4, 5, and 6. Line 0 of FIG. 5 shows an example of a digital signal to be transmitted. The length of the optical waveguide is chosen so that the propagation time difference $\Delta\tau$ equals the duration of three bits. Lines 1–21 show the time variation of the wave trains. A wave train with the wavelength $\lambda_1$ corresponds to a transmitted logic 1, and a wave train with the wavelength $\lambda_0$ to a transmitted logic 0. Line 1 shows a wave train of wavelength $\lambda_1$, which leads the wave train of wavelength $\lambda_0$ by three bits. At the time of the fifth clock pulse, for example, the wave train of the fifth bit, wavelength $\lambda_0$, and the wave train of the eighth bit are superimposed. As a result, the electric output signal V is increased in magnitude. In line 22, at the fifth clock pulse, the threshold value $V_1$ is exceeded. Line 22 shows the electric output signal V obtained at the end of the fiber-optic link after the optical-to-electrical transducer. The three ranges of values are indicated: Range I lies above the upper threshold value $V_1$, range II below the lower threshold value $V_0$, and range III between the lower and upper threshold values.

Based on Line 22 of FIG. 5 and on the circuit of FIG. 4, the table of FIG. 6 can be compiled. With the signals $S_0$, $S_1$, $S_2$, c, d, . . . , i, k indicated in FIG. 4, the state table is self-explanatory, but by way of example, the formation of the signals at three clock times will be explained. The clock is recovered by measuring eye patterns. Care must be taken to ensure that the minima and maxima of the electric output signal V are covered by the clock pulses.

At the eighth clock pulse, the sample value lies between the threshold values in the third range; since $S_2$="1", d is "1" and e is "0"; on the next clock pulse, f="1" sets the signal h="1"; this is the state of the output k at the preceding clock pulse. At the ninth clock pulse, the sample value is above the two threshold values ($V>V_0$ and $V<V_1$), and since $S_2$="0", d and e are both "0"; on the next clock pulse, f="1" sets the signal h="1". At the tenth clock pulse, the sample value is below the threshold values, i.e., $V<V_0$ and $V<V_1$, and since $S_2$="0", d and e are "0"; on the next clock pulse, g="1" sets the signal h="0". These clock times are indicated in the table by arrows.

It can be seen that from the seventh clock pulse, the output signal of the circuit agrees with the digital signal. The information of the first six bits is lost. This can be prevented, however, if the first six bits represent an arbitrary test sequence, for example, and the information only beings with the seventh bit.

The digital signal appears at the Q output of each of the flip-flops 38 and 39 correspondingly delayed, e.g., at the Q output of the RS flip-flop 38. In this case, the digital signal is already valid after the fifth clock pulse.

In the embodiments it was shown that for N=3, the digital signal can be recovered. In conclusion it will be shown that the digital signal can be recovered even if the time difference $\Delta\tau$ is equal to the duration of an arbitrary number (N) of bits. This time difference $\Delta\tau$ may also be equal to a nonintegral multiple of the duration of one bit. For the (N−1)-bit delay circuit, N must then be rounded up to an integer.

A digital signal with a bit sequence $S_K$ is to be transmitted, $S_K \in \{0, 1\}$.

The optical-to-electrical transducer converts this digital signal to an electric output signal $V_K$ with three possible states $V_K \in \{H, U, L\}$:

$$V_K = \begin{cases} H \text{ if } S_K = O \text{ and } S_{K+N} = 1 \\ U \text{ if } S_K = O \text{ and } S_{K+N} \\ L \text{ if } S_K = 1 \text{ and } S_{K+N} = 0 \end{cases} \quad (1)$$

The first state of the receive-side circuit 6 provides an output signal $D_K \in \{0, 1\}$:

$$D_K = \begin{cases} 1 & \text{if } V_K = H \\ D_{K-N} & \text{if } V_K = U \\ 0 & \text{if } V_K = L \end{cases} \quad (2)$$

It must be shown that $$S_K = D_{K-N}, \quad (3)$$

i.e., the receive-side circuit recovers the digital signal.

Substituting equation (1) into equation (2) yields $$D_K = \begin{cases} 1 & \text{if } S_K = O \text{ and } S_{K+N} = 1 \\ D_N & \text{if } S_K = S_{K+N} \\ O & \text{if } S_K = 1 \text{ and } S_{K+N} = 0 \end{cases}$$

and for $K \rightarrow (K-N)$, $$D_{K-N} = \begin{cases} 1 & \text{if } S_{K-N} = O \text{ and } S_K = 1 & \text{(i)} \\ D_{K-2N} & \text{if } S_{K-N} = S_K & \text{(ii)} \\ O & \text{if } S_{K-N} = 1 \text{ and } S_K = 0 & \text{(iii)} \end{cases}$$

Case (i): From $D_{K-N}=1$ and $S_K=1$, we obtain $D_{K-N}=S_K$.

Case (ii): From $D_{K-N}=0$ and $S_K=0$, we obtain $D_{K-N}=S_K$.

Case (iii): a) Let $S_{K-N}=S_K=1$.

For $D_{K-2N}=1$, we obtain $D_{K-N}=S_K$, i.e., equation (3) holds if $D_{K-2N}$ was set equal to 1. That will be the case if a change of state from 0 to 1 occurred earlier, cf. case (i):

$D_{K-mN}=1$ if $S_{K-mN}=0$ and $S_{K-(m-1)N}=1$.

Case (iii): b) Let $S_{K-N}=S_K=0$

Analogous to case a): a change of state from 1 to 0 must have occurred earlier.

Equation (3) thus holds with the following limitation: Signal components with the period N cannot be decoded, i.e., if $S_K = S_{K+mN}$ $m \in \{ \ldots -2, -1, 0, 1, 2, \ldots \}$, then $D_{K+mN}$ is indeterminate.

A single change of state $S_K \neq S_{K+N}$ suffices to set $D_K$ to the correct state, which is then retained.

Although the invention has been described with reference to the above-specified embodiments, this description is not meant to be construed in a limiting sense. Various modifications of the disclosed embodiment, as well as alternative embodiments of the invention will become apparent to a person skilled in the art upon reference to the above description. It is therefore contemplated that the appended claims will cover such modifications that fall within the true scope of the invention.

What is claimed is:

1. A receive-side circuit for a system for optically transmitting a digital signal over an optical waveguide which is dispersive at the operating wavelength, said system comprising an optical transmitter whose optical output signal, which is frequency-modulated by the digital signal, is optically transmitted over the optical waveguide, the input to said receive-side circuit being an electric output signal (V) from an optical-to-electrical transducer which passes through three ranges of values, a first of said ranges lying above an upper threshold value ($V_1$), a second below a lower threshold value ($V_0$), and a third between the upper and lower threshold values, said receive-side circuit recovering the digital signal from sample values of the electric output signal (V), characterized in that its output assumes a first state when a sample value lies in the first range of values, that its output assumes a second state when a sample value lies in the second range of values, and that its output assumes the state which was present at the same output N bits earlier when a sample value lies in the third range of values, where N is the rounded-up integral value of $$\frac{\Delta\lambda \cdot D \cdot L}{T}$$

where D is the dispersion of the optical waveguide, L is the length of the optical waveguide, T is the duration of one bit, and $\Delta\lambda$ is the wavelength difference underlying the frequency modulation.

2. A receive-side circuit as claimed in claim 1, characterized in that it includes a comparator circuit, a logic circuit, and an (N−1)-bit delay circuit, that the comparator circuit delivers a first binary signal ($S_1$) when the sample value at its input lies in a first range, that the comparator circuit delivers a second binary signal ($S_0$) when the sample value lies in the second range, that the comparator circuit delivers a third binary signal ($S_2$) when the sample value lies in the third range, and that the logic circuit delivers at its output in the first case a given logic value, in the second case the inverted logic value, and in the third case the logic value which appeared at the output of the (N−1)-bit delay circuit N bits earlier, the logic circuit introducing a delay equal to the duration of one bit.

3. A receive-side circuit or a system as claimed in claim 2, characterized in that the (N−1)-bit delay circuit is contained in a feedback loop from the output to one of the inputs of the logic circuit.

4. A receive-side circuit or a system as claimed in claim 2, characterized in that the (N−1)-bit delay circuit is contained, at least in part, in a signal path following the logic circuit, and that its output is fed back to one of the inputs of the logic circuit.

5. A system for optically transmitting a digital signal over an optical waveguide which is dispersive at the operating wavelength, said system comprising an optical transmitter on the transmit side whose optical output signal is frequency-modulated by the digital signal, an optical-to-electrical transducer on the receive side which converts its optical input signal, which passes through three ranges of values, into an electric output signal (V) which corresponds to the intensity variation of the optical input signal and passes through three ranges of values, a first of said ranges of values lying above an upper threshold value ($V_1$), a second below a lower threshold value ($V_0$), and a third between the upper and lower threshold values, and a circuit following the optical-to-electrical transducer which recovers the digital signal from the sample values of the electric output signal (V) of the optical-to-electrical transducer, characterized in that its output assumes a first state when a sample value lies in the first range of values, that its output assumes a second state when a sample value lies in the second range of values, and that its output assumes the state which was present at the same output N bits earlier when a sample value lies in the third range of values, where N is the rounded-up integral value of $$\frac{\Delta\lambda \cdot D \cdot L}{T}$$

where D is the dispersion of the optical waveguide, L is the length of the optical waveguide, T is the duration of one bit, and $\Delta\lambda$ is the wavelength difference underlying the frequency modulation.

6. A system as claimed in claim 5, characterized in that the circuit for recovering the digital signal contains a comparator circuit, a logic circuit, and an (N−1)-bit delay circuit (22), that the comparator circuit delivers a first binary signal ($S_1$) when the sample value at its input lies in a first range, that the comparator circuit delivers a second binary signal ($S_0$) when the sample value lies in the second range, that the comparator circuit delivers a third binary signal ($S_2$) when the sample value lies in the third range, and that the logic circuit delivers at its output in the first case a given logic value, in the second case the inverted logic value, and in the third case the logic value which appeared at the output of the (N−1)-bit delay circuit N bits earlier, the logic circuit introducing a delay equal to the duration of one bit.

7. A receive-side circuit or a system as claimed in claim 6, characterized in that the (N−1)-bit delay circuit is contained in a feedback loop from the output to one of the inputs of the logic circuit.

8. A receive-side circuit or a system as claimed in claim 6, characterized in that the (N−1)-bit delay circuit is contained, at least in part, in a signal path following the logic circuit, and that its output is fed back to one of the inputs of the logic circuit.

* * * * *